(12) United States Patent
Shimizu et al.

(10) Patent No.: US 9,199,393 B2
(45) Date of Patent: Dec. 1, 2015

(54) HIGH-SHEAR MELT-KNEADER AND METHOD OF HIGH SHEARING

(75) Inventors: Hiroshi Shimizu, Ibaraki (JP); Yongjin Li, Hangzhou (CN); Yukio Yoshizawa, Nagaoka (JP); Takayuki Takahashi, Niigata (JP); Ken-ichi Toyoshima, Gosen (JP)

(73) Assignee: NIIGATA MACHINE TECHNO CO., LTD. (JP)

( * ) Notice: Subject to any disclaimer, the term of this patent is extended or adjusted under 35 U.S.C. 154(b) by 14 days.

(21) Appl. No.: 13/147,925

(22) PCT Filed: Feb. 2, 2010

(86) PCT No.: PCT/JP2010/000614
§ 371 (c)(1),
(2), (4) Date: Aug. 4, 2011

(87) PCT Pub. No.: WO2010/089997
PCT Pub. Date: Aug. 12, 2010

(65) Prior Publication Data
US 2011/0292756 A1    Dec. 1, 2011

(30) Foreign Application Priority Data
Feb. 5, 2009    (JP) ................ P2009-025088

(51) Int. Cl.
| B29B 7/28 | (2006.01) |
| B29B 7/14 | (2006.01) |
| B29B 7/88 | (2006.01) |

(52) U.S. Cl.
CPC ... *B29B 7/28* (2013.01); *B29B 7/14* (2013.01); *B29B 7/88* (2013.01)

(58) Field of Classification Search
CPC .................................................... B29B 7/28
USPC .......... 366/76.2, 76.4, 83; 425/143–145, 204, 425/205
See application file for complete search history.

(56) References Cited

U.S. PATENT DOCUMENTS 2,615,199 A * 10/1952 Fuller ................ 425/192 R
3,354,504 A * 11/1967 Lehner ................ 366/76.2
(Continued)

FOREIGN PATENT DOCUMENTS

| CN | 2455458 Y | 10/2001 |
| JP | 2005-313608 | 11/2005 |

(Continued)

OTHER PUBLICATIONS

International Search Report mailed Apr. 27, 2010 in corresponding PCT International Application No. PCT/JP2010/000614.
(Continued)

*Primary Examiner* — David Sorkin
*Assistant Examiner* — Abbas Rashid
(74) *Attorney, Agent, or Firm* — Ostrolenk Faber LLP

(57) ABSTRACT

A high-shear melt-kneader includes a high-shear unit (20) having an internal feedback-type screw (23) configured to apply high-shear stress to a melted resin, resin pressure sensors (33) for configured to detect a front portion resin pressure in the vicinity of an inlet of the internal feedback-type screw and a rear portion resin pressure in the vicinity of an outlet, and a control device configured to appropriately control a material supplying amount, a material temperature, a kneading time, and a screw rotation speed according to pressure values detected by the sensors. The control device controls the conditions such that waveforms with the lapse of time of the front and rear portion resin pressures are similar to each other and show variation to a steady state after formation of a predetermined peak value, and the front and rear portion resin pressures form a predetermined pressure difference with the lapse of time. According to the high-shear melt-kneader, it is possible to improve high-shear efficiency, increase precision of nano dispersion of a material, and stably and finely disperse/mix internal structures of immiscible polymer blend-based, polymer/filler-based and polymer blend/filler-based materials to a nano level.

13 Claims, 8 Drawing Sheets

(56) References Cited

U.S. PATENT DOCUMENTS

| | | | |
|---|---|---|---|
| 3,868,093 A * | 2/1975 | Sokolow | 366/76.6 |
| 3,905,588 A * | 9/1975 | Reinhart | 366/88 |
| 4,110,843 A * | 8/1978 | Skidmore | 366/76.4 |
| 4,183,673 A * | 1/1980 | Easley et al. | 366/76.2 |
| 4,194,842 A * | 3/1980 | Puthawala | 588/8 |
| 4,289,408 A * | 9/1981 | Langlois | 366/76.2 |
| 4,310,251 A * | 1/1982 | Scharer et al. | 366/77 |
| 4,352,567 A * | 10/1982 | Guibert | 366/76.2 |
| 4,534,652 A * | 8/1985 | Stade | 366/85 |
| 4,744,669 A * | 5/1988 | Kowalczyk et al. | 366/77 |
| 4,834,639 A * | 5/1989 | Eschbach et al. | 425/131.1 |
| 5,143,699 A * | 9/1992 | Herter | 422/163 |
| 5,259,670 A * | 11/1993 | Brown | 366/83 |
| 5,261,740 A * | 11/1993 | Mosher et al. | 366/76.9 |
| 5,265,955 A * | 11/1993 | Guggiari | 366/85 |
| 5,304,053 A * | 4/1994 | Gohlisch et al. | 425/204 |
| 5,626,420 A * | 5/1997 | Deal et al. | 366/76.6 |
| 5,718,570 A * | 2/1998 | Beckett et al. | 417/517 |
| 5,829,872 A * | 11/1998 | Mizuguchi et al. | 366/77 |
| 5,909,958 A * | 6/1999 | Rauwendaal | 366/76.2 |
| 7,083,320 B2 * | 8/2006 | Murakami et al. | 366/76.6 |
| 7,316,335 B2 * | 1/2008 | Colburn et al. | 222/413 |
| 7,350,960 B2 * | 4/2008 | Ziegenfus et al. | 366/88 |
| 7,468,404 B2 * | 12/2008 | Ibar | 523/312 |
| 2005/0094486 A1 * | 5/2005 | Taniguchi | 366/171.1 |
| 2006/0120212 A1 * | 6/2006 | Taniguchi et al. | 366/118 |
| 2008/0045657 A1 * | 2/2008 | Shimizu et al. | 525/165 |
| 2008/0318318 A1 * | 12/2008 | Shimizu et al. | 435/396 |

FOREIGN PATENT DOCUMENTS

| | | |
|---|---|---|
| JP | 2006-241195 | 9/2006 |
| JP | 2009-013323 | 1/2009 |

OTHER PUBLICATIONS

Chinese Office Action, dated May 30, 2013, issued in corresponding Chinese Patent Application No. 201080006686.5. Total 7 pages, including English translation of only the Search Report.

* cited by examiner

PRIOR ART

PRIOR ART

HIGH-SHEAR MELT-KNEADER AND METHOD OF HIGH SHEARING

CROSS-REFERENCE TO RELATED APPLICATIONS

The present application is a 35 U.S.C. §§371 national phase conversion of PCT/JP2010/000614, filed Feb. 2, 2010, which claims priority of Japanese Patent Application No. 2009-025088, filed Feb. 5, 2009, the contents of which are incorporated herein by reference. The PCT International Application was published in the Japanese language.

FIELD OF THE INVENTION

The present invention relates to a high-shear melt-kneader and method of high-shearing to disperse and mix inner structures of these materials to a nano level by performing high-shear of immiscible polymer blend-based, polymer/filler-based, and polymer blend/filler-based materials.

BACKGROUND ART

Conventionally, in incompatible resins (immiscible) polymer blend-based materials in a stationary stage, a high-shear melt-kneader for manufacturing a polymer blend extrusion material having a dispersion phase in a size of tens of nanometers without addition of extra additives such as a compatibilizing agent has been known (for example, see Patent Document 1).

Patent Document 1 discloses a high-shear melt-kneader, with which an internal-feedback type high-shear screw is equipped, having a structure for rapidly rotating 2 to 5 grams of a polymer blend sample in a melted state using the high-shear screw at a speed of, for example, 500 to 3000 rpm, and kneading for a few minutes to disperse the sample in a nano size, thereby manufacturing a polymer blend extrusion material having excellent heat-resistance, mechanical characteristics, dimensional stability, and so on.

FIG. 8 shows a schematic configuration of a high-shear melt-kneader disclosed in Patent Document 1. In a high-shear melt-kneader 100 shown in FIG. 8 in a state in which a high-shear screw 102 inserted into a heating tube 101 is rotated at a low speed of, for example, 120 to 240 rpm, pellet samples (polymer blend-based resin) 104 in a solid phase are pushed through an inlet hole 101*a* from an inlet 103 by a rod to be directly input into the high-shear screw 102 to perform plasticization, and then, the screw 102 is rapidly rotated to perform a high-shear operation. In addition, a tapered surface 102*a* having an enlarged diameter is formed in a groove surface (a groove surface between screw blades) of an outer circumference of the high-shear screw 102 from a rear end side (a base end side) toward a front end side thereof. By forming the tapered surface 102*a*, the pellet samples 104 in a solid phase introduced into the high-shear screw 102 are moved from the rear end side to the front end side of the screw to be pressurized so that the pellet samples 104 are plasticized from the solid phase and melted.

PRIOR ART DOCUMENT

Patent Document

[Patent Document 1] Japanese Patent Application, First Publication No. 2005-313608

DISCLOSURE OF THE INVENTION

Problems to be Solved by the Invention

However, the conventional high-shear melt-kneader has the following problems.

The high-shear melt-kneader disclosed in Patent Document 1 has two functions of the high-shear screw 102 shown in FIG. 8, a function of plasticizing a polymer blend-based resin in a solid phase by low-speed rotation, and a function of high-shearing the melted resin by high-speed rotation. That is, since the solid phase resin is compressed and plasticized to be melted, the outer circumference of the high-shear screw must be formed in the tapered surface 102*a*, i.e., a compression shape. However, due to formation of the tapered surface 102*a*, since a certain shearing stress is not applied to the resin that is highly sheared, high-shear efficiency is decreased.

In addition, conditions such as a heating temperature, a resin pressure, and so on for plasticizing the resin to obtain an optimally melted resin are different from conditions for high-shearing the melted resin to obtain an optimally dispersed nano resin. That is, in a method of continuously performing the plasticization and high-shearing using the same high-shear screw as the conventional art, it is difficult to set optimal conditions required for the high-shear. As a result, nano dispersion of the resin becomes insufficient and formed products extruded from transparent polymer blends become cloudy or brown, and thus, transparency of the products may be degraded and good extruded products may not be stably manufactured.

In consideration of the above problems, it is an object of the present invention to provide a high-shear melt-kneader and a high-shear method capable of improving high-shear efficiency, increasing precision of nano dispersion of a material, and stably and finely dispersing/mixing inner structures of immiscible polymer blend-based, polymer/filler-based, and polymer blend/filler-based materials to a nano level.

Means for Solving the Problems

According to the present invention, a high-shear melt-kneader for applying high-shear stress and kneading immiscible polymer blend-based, polymer/filler-based and polymer blend/filler-based materials to disperse/mix internal structures of the materials to a nano level is provided. The melt-kneader includes: a pre-heating portion configured to heat the materials; a high-shear portion configured to supply the materials heated by the pre-heating portion and including an internal feedback-type screw which applies the high-shear stress to the supplied material and a material heating tube; a pressure sensor formed in the heating tube and configured to detect a first pressure in the vicinity of an inlet of a feedback hole of the internal feedback-type screw and a second pressure in the vicinity of an outlet thereof; and a control means configured to control at least one of a material supplying amount, a material temperature, a kneading time, and a screw rotation speed according to a pressure value detected by the pressure sensor. In addition, a pressure is generated in the vicinity of the outlet of the feedback hole of the internal feedback-type screw during the high-shear, and the control means controls such that waveforms with the lapse of time of the first pressure and the second pressure are similar to each other and show variation to a steady state after formation of a predetermined peak value, and the first pressure and the second pressure form a predetermined pressure difference with the lapse of time.

In addition, according to the present invention, a high-shear method of applying high-shear stress and kneading immiscible polymer blend-based, polymer/filler-based and polymer blend/filler-based materials to disperse/mix internal structures of the materials to a nano level is provided. The method includes: a first process of pre-heating the materials; a second process of supplying the materials heated in the first process to a high-shear portion, and applying high-shear stress to the materials using an internal feedback-type screw; a third process of detecting a first pressure in the vicinity of an inlet of a feedback hole of the internal feedback-type screw and a second pressure in the vicinity of an outlet thereof, and a fourth process of controlling at least one of a material supplying amount, a material temperature, a kneading time, and a screw rotation speed according to a pressure value detected in the third process. In addition, a pressure is generated in the vicinity of the outlet of the feedback hole of the internal feedback-type screw during the high-shear, and the fourth process includes controlling such that waveforms with the lapse of time of the first pressure and the second pressure are similar to each other and show variation to a steady state after formation of a predetermined peak value, and the first pressure and the second pressure form a predetermined pressure difference with the lapse of time.

In the present invention, during the high-shear, an optimal material heated to an arbitrary temperature by the pre-heating portion is supplied to the high-shear portion, and the internal feedback-type screw is rotated at a predetermined rotation speed while a material temperature, a material pressure, a kneading time, and a screw rotation speed are controlled under optimal conditions of the high-shear portion, so that the material flows to the outlet from the inlet of the feedback hole to be circulated and kneaded to apply high-shear stress. Specifically, waveforms with the lapse of time of a first pressure in the vicinity of the inlet of the feedback hole of the internal feedback-type screw and a second pressure in the vicinity of the outlet are similar to each other and show variation to a steady state after formation of a predetermined peak value, and the first pressure and the second pressure are controlled to form a predetermined pressure difference with the lapse of time, so that the high-shear stress having a uniform flow can be applied to the material kneaded by rotation of the internal feedback-type screw. Accordingly, the high-sheared material can be uniformly nano-dispersed throughout the material, and internal structures of the immiscible polymer blend-based, polymer/filler-based and polymer blend/filler-based materials can be dispersed/mixed to a nano level in a good state in which transparency is high.

In addition, as the high-shear portion and the pre-heating portion are separated from each other, there is no need to provide an ability or shape for heating or plasticizing the material to the internal feedback-type screw to melt the material. Accordingly, optimal control corresponding to the high-shear condition can be performed.

Further, in the high-shear melt-kneader in accordance with the present invention, the pre-heating portion may be a plasticization portion for plasticizing and melting the solid phase material.

In this device, for example, the solid phase polymer blend-based resin may be melted and plasticized in the plasticization, and the plasticized material may become a high-shear object material at the high-shear portion.

Furthermore, in the high-shear melt-kneader in accordance with the present invention, the plasticization portion may include a plasticization screw for melting the material in a solid phase; and an injection portion for injecting the material plasticized by the plasticization screw to the high-shear portion.

In this device, for example, the solid phase polymer blend-based resin is supplied to the plasticization screw to be kneaded at an appropriate temperature and rotation speed, so that the resin can be plasticized to obtain the melted resin. In addition, the injection portion may be connected to the supplying portion of the high-shear portion, and the plasticized melted resin may be injected from the injection portion so that a desired shape of resin can be supplied into the high-shear portion.

Further, in the high-shear melt-kneader in accordance with the present invention, a rotation speed of the internal feedback-type screw may be 100 to 3000 rpm.

Furthermore, in the high-shear melt-kneader in accordance with the present invention, a material supplying portion may be formed at the high-shear portion to supplying the material heated by the pre-heating portion, and an introduction valve may be formed at the material supplying portion to enable opening/closing control.

According to the above configuration, the introduction valve may be automatically opened/closed to control a supplying amount of the material according to a preset time, and so on, and the high-shear can be effectively performed.

In addition, in the high-shear melt-kneader in accordance with the present invention, a material discharge portion may be formed at the high-shear portion to discharge the high-sheared material, and a discharge valve may be formed at the material discharge portion to enable opening/closing control.

In the device, the discharge valve can be automatically opened/closed according to a preset time, and so on, to control a discharge amount of the material nano-dispersed by the high-shear, and the high-shear can be effectively performed.

Further, in the high-shear melt-kneader in accordance with the present invention, an outer diameter dimension of the internal feedback-type screw may be uniform in an axial direction thereof.

Accordingly, in comparison with a screw, which functions as plasticization, having a compression shape (a tapered shape) formed at the outer circumference (a groove surface between screw blades) of the internal feedback-type screw, a gap formed at the outer circumference (the groove surface) of the internal feedback-type screw is uniform in the axial direction. That is, since a gap at the outer circumference of the screw adjacent to the front end side is not decreased like the compression shape, a material required for kneading may be smoothly circulated to increase high-shear efficiency. In addition, a design range of the screw shape may be widened to perform the high-shear, and an appropriate shape of screw may be used to correspond to conditions such as a material, machinability, and so on, of the melted resin.

Further, in the high-shear melt-kneader in accordance with the present invention, the material heating tube may have a notch portion formed at a predetermined position corresponding to a base end side of the internal feedback-type screw.

In the device, the material leaked from the rear end of the internal feedback-type screw during the high-shear may be smoothly discharged downward from the notch portion. Accordingly, for example, it is possible to prevent introduction of the material into a bearing, and so on, formed at a base end side (a rear side) of the internal feedback-type screw, and a stable continuous operation may be performed at the high-shear portion.

Furthermore, in the high-shear melt-kneader in accordance with the present invention, a tapered heating tube surface may be formed in an inner surface of the base end side of the material heating tube such that an inner diameter thereof is enlarged from the front end side to the base end side.

In the device, the material leaked from the rear end of the internal feedback-type screw is guided to the rear end side of the material heating tube during the high-shear, and thus, the material can be smoothly discharged downward from the rear end portion. Accordingly, for example, it is possible to prevent introduction of the material into a bearing, and so on, formed at a base end side (a rear side) of the internal feedback-type screw, and a stable continuous operation may be performed at the high-shear portion.

In addition, in the high-shear melt-kneader in accordance with the present invention, a cooling flow path may be formed at a predetermined position of the base end side of the material heating tube.

In the device, the material leaked from the base end portion of the internal feedback-type screw is cooled and solidified during the high-shear, and the material comes to be easily stuck to the outer circumference of the shaft connected to a rotary shaft of the internal feedback-type screw. Accordingly, it is possible to prevent the material from being dropped and leaked from the middle of the shaft, and the material can be moved to an appropriate rear portion along the shaft to be removed.

Further, in the high-shear melt-kneader in accordance with the present invention, a shaft may be formed at the front end portion to concentrically connect rotary shafts of the internal feedback-type screw and a drive motor for driving the screw, and a threaded groove portion having a reverse thread shape may be formed in an outer circumference of the front end of the shaft adjacent to the internal feedback-type screw.

In the device, together with rotation of the shaft, the material leaked from the rear end of the internal feedback-type screw is guided to the threaded groove portion during the high-shear to be sent to the rear portion of the shaft (an opposite direction of the internal feedback-type screw). Accordingly, the leaked material can be more effectively discharged.

Furthermore, in the high-shear melt-kneader in accordance with the present invention, the shaft may be rotatably supported at a middle portion in the axial direction by an anti-vibration support portion, and a tapered shaft surface may be formed at a predetermined position adjacent to the internal feedback-type screw, rather than the anti-vibration support portion, and may have an inner diameter increased from the screw side to the drive motor side.

In the device, as the material leaked from the base end portion of the internal feedback-type screw is cooled and solidified during the high-shear, the material can be moved rearward along the shaft. In addition, since the material moved rearward arrives at the tapered shaft surface formed at the front side, rather than the anti-vibration support portion, to move in a direction in which the tapered surface is enlarged, to be automatically divided, the material can be freely dropped from the tapered shaft surface. That is, since the material leaked from a position of the front portion of the anti-vibration support portion (the side of the internal feedback-type screw) is removed, it is possible to prevent introduction of the material into the bearing, and so on, formed at the anti-vibration support portion.

Effects of the Invention

According to a high-shear melt-kneader and a high-shear method in accordance with the present invention, with respect to a material having an optimal temperature and supplied from a pre-heating portion in a high-shear portion, at least one of a supplying amount of the material, a temperature of the material, a kneading time, and the number of rpm of a screw is controlled according to a pressure of the material upon the high-shear, and thus, the high-shear capable of efficiently dispersing the material to a nano size can be performed with high precision. Therefore, inner structures of immiscible polymer blend-based, polymer/filler-based, and polymer blend/filler-based materials in a stable and fine state can be continuously dispersed/mixed to a nano level.

MODE(S) FOR CARRYING OUT THE INVENTION

Hereinafter, embodiments of a high-shear melt-kneader and a high-shear method in accordance with the present invention will be described with reference to FIGS. 1 to 6.

Figure 1:
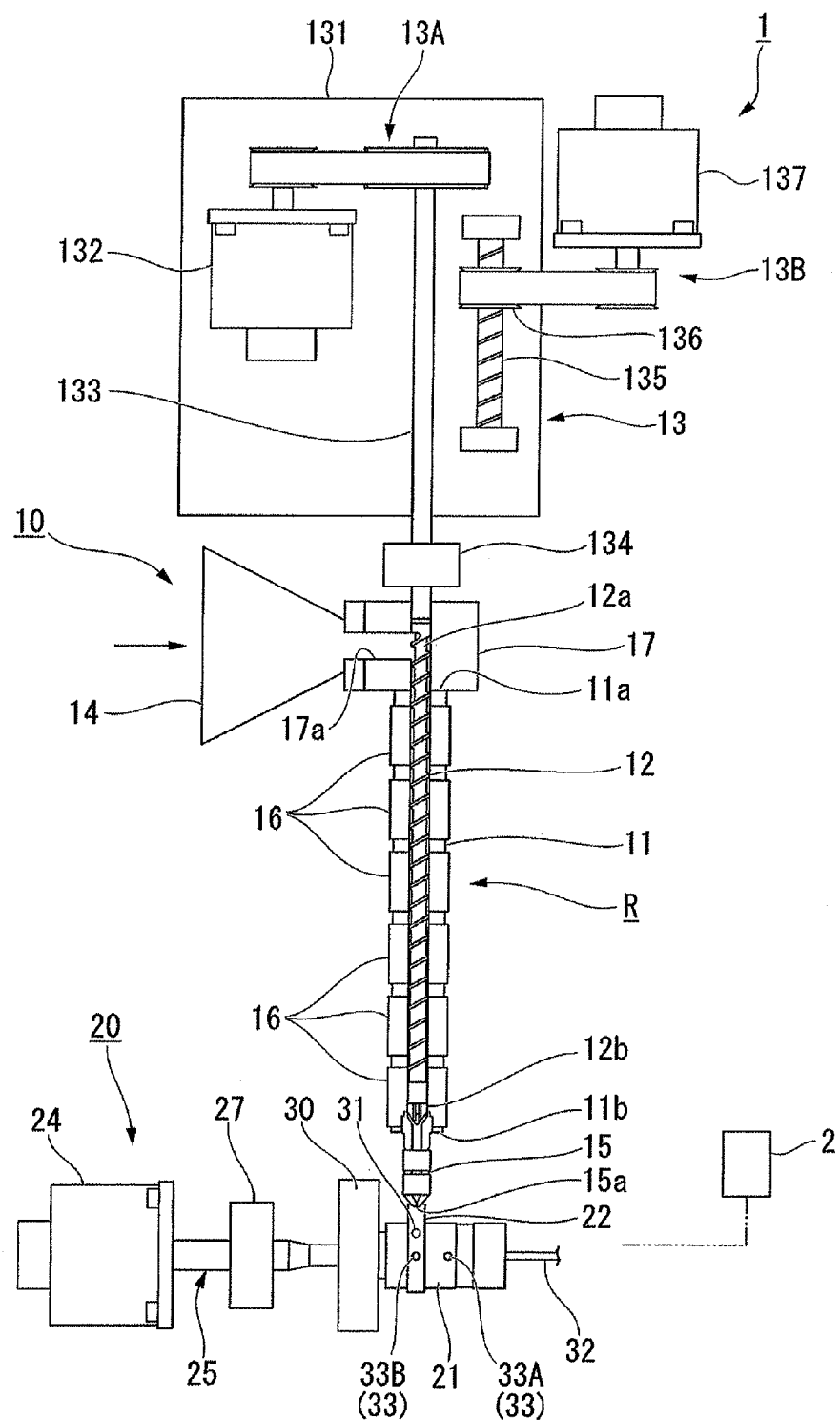
FIG. 1 is a partially cut plan view showing a schematic configuration of a high-shear melt-kneader in accordance with an embodiment of the present invention.

In FIG. 1, reference numeral 1 represents a high-shear melt-kneader in accordance with the embodiment. The high-shear melt-kneader 1 is provided to apply high-shear stress to a polymer blend-based resin in a melted state (corresponding to a material of the present invention) and knead the resin, dispersing/mixing inner structures of immiscible polymer blend-based, polymer/filler-based, and polymer blend/filler-based materials to a nano level.

As shown in FIG. 1, the high-shear melt-kneader 1 of the embodiment includes a plasticization unit 10 (a plasticization portion and a pre-heating portion), and a high-shear unit 20 (a high-shear portion). The plasticization unit 10 plasticizes and melts a polymer blend-based resin in a solid phase (hereinafter, referred to as "a solid phase resin"). The high-shear unit 20 introduces the melted resin plasticized by the plasticization unit 10 from an supplying portion 22, and rotates an internal feedback-type screw 23 inserted into a heating tube 21 at a speed of, for example, 100 to 3000 rpm to knead and high-shear the melted resin, dispersing the melted resin to a nano size.

Here, in the following description, a feed side of each screw of a plasticization screw 12 and the internal feedback-type screw 23 of the plasticization unit 10 and the high-shear unit 20 in an axial direction thereof is referred to as a front portion, a fore end or a front end, and an opposite side is referred to as a rear portion, a rear end, or a base end. In addition, similarly, in the heating tube 11 of the plasticization unit 10 and the heating tube 21 of the high-shear unit 20 to be described later, a feed side of each of the screws 12 and 23 inserted thereinto is referred to as a front portion, a fore end or a front end, and an opposite side is referred to as a rear portion, a rear end, or a base end.

In the plasticization unit 10, a rotation direction of the plasticization screw 12 (to be described later) for kneading and plasticization-melting the solid phase resin is disposed in a substantially horizontal direction. In addition, in the high-shear unit 20, the internal feedback-type screw 23 (to be described later) for high-shearing the melted resin introduced from the plasticization unit 10 is disposed in a substantially horizontal direction perpendicular to the rotational shaft direction of the plasticization screw 12. Further, the plasticization unit 10 is configured to detachably attach an injection nozzle 15 to be described later to the supplying portion 22 of the high-shear unit 20.

Here, the high-shear melt-kneader 1 shown in FIG. 1 is shown in a plan view, a portion (of the plasticization screw 12 to be described later) of which is cut. However, for the purpose of easy observation, a hopper 14 and a hopper frame 17, which will be described later, are shown from a side view.

Materials used in the high-shear melt-kneader 1 may be exemplified as immiscible polymer blend-based, polymer/filler-based and polymer blend/filler-based materials. For example, the immiscible polymer blend-based materials may be exemplified as a combination of polyvinylidene fluoride (PVDF) and polyamide 11 (PA11) or a combination of polycarbonate PC and polymethyl methacrylate. The polymer/filler-based materials may be exemplified as a combination of poly lactic acid and carbon nano tubes (CNT), and the polymer blend/filler-based materials may be exemplified as a combination of PVDF, polyamide 6 and CNT, and so on.

The plasticization unit 10 shown in FIG. 1 generally includes the heating tube 11 having a substantially cylindrical shape disposed in a substantially horizontal direction, the plasticization screw 12 freely rotatable in a circumferential direction and freely reciprocable in an axial direction while being inserted into the heating tube 11, a drive portion 13 disposed at a base end portion 12a constituting one end side in an axial direction of the plasticization screw 12 and rotating and axially reciprocating the plasticization screw 12, the hopper 14 for supplying a solid phase resin into the base end portion 12a of the plasticization screw 12, and the injection nozzle 15 (an injection portion) formed at a front end portion 12b constituting the other end side of the plasticization screw 12 in an axial direction (an opposite side of the base end portion 12a (the side of the hopper 14).

A longitudinal direction of the heating tube 11 of the plasticization unit 10 is held in a substantially horizontal direction and an outer circumference thereof is covered by a plurality of heaters 16. That is, the heaters 16 are temperature-controlled to adjust the temperature of the heating tube 11. In addition, the hopper frame 17 having an insertion hole 17a for supporting the hopper 14 and dropping the solid phase resin supplied into the hopper 14 onto the base end portion 12a of the plasticization screw 12 is fixed to the base end portion 11a of the heating tube 11. Further, the injection nozzle 15 is attached to an inner surface of a front end portion 11b of the heating tube 11 in a state in which a flow path (an injection port 15a) is in communication with a hollow portion (a plasticization region R) of the heating tube 11. Furthermore, the heating tube 11 is temperature-controlled by a temperature sensor 18 shown in FIG. 3.

Here, the plasticization region R is a space between the heating tube 11 and the plasticization screw 12, i.e., a region to which the solid phase resin is supplied from the hopper 14.

The plasticization screw 12 is disposed substantially concentrically with the heating tube 11, and the temperature of the resin kneaded by the heating tube 11 in the screw is adjusted. In addition, the base end portion 12a of the plasticization screw 12 arrives at the insertion hole 17a of the hopper frame 17 to be straightly connected to a screw rotary shaft 133 of the drive portion 13, which will be described later.

The drive portion 13 includes a rotary mechanism 13A for rotating the plasticization screw 12, and an injection mechanism 13B for axially reciprocating the plasticization screw 12 to inject the melted resin in the screw 12 from the injection nozzle 15.

The rotary mechanism 13A includes a first drive motor 132 fixed on a fixing portion 131, and a screw rotary shaft 133 to which a rotational force is transmitted by the drive motor 132. In addition, the screw rotary shaft 133 and the base end portion 12a of the plasticization screw 12 are straightly connected to each other by a connection plate 134.

The injection mechanism 13B includes a ball screw 135 having a threaded shaft disposed in parallel in the axial direction of the plasticization screw 12 and fixed to the fixing portion 131, a nut 136 rotatably and threadedly engaged with the ball screw 135, and a second drive motor 137 separately disposed from the fixing portion 131 while transmitting a rotational force to the nut 136. As the ball screw 135 is reciprocally moved with respect to the nut 136 rotated by the drive of the second drive motor 137, the fixing portion 131 to which the ball screw 135 is fixed, the first drive motor 132 on the fixing portion 131, and the plasticization screw 12 formed through the screw rotary shaft 133 are reciprocated in the axial direction. That is, the plasticization screw 12 has a function of injecting the melted resin plasticized in the heating tube 11 through rotation and reciprocal movement from the injection nozzle 15.

Figure 2:
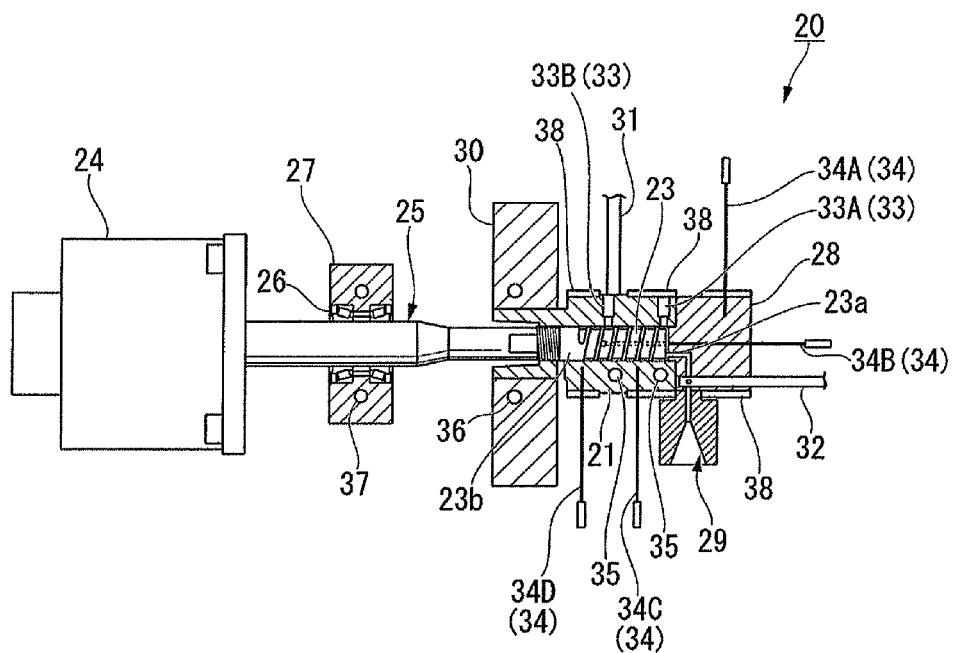
FIG. 2 is a partially cut side view showing a configuration of the high-shear unit.
Figure 3:
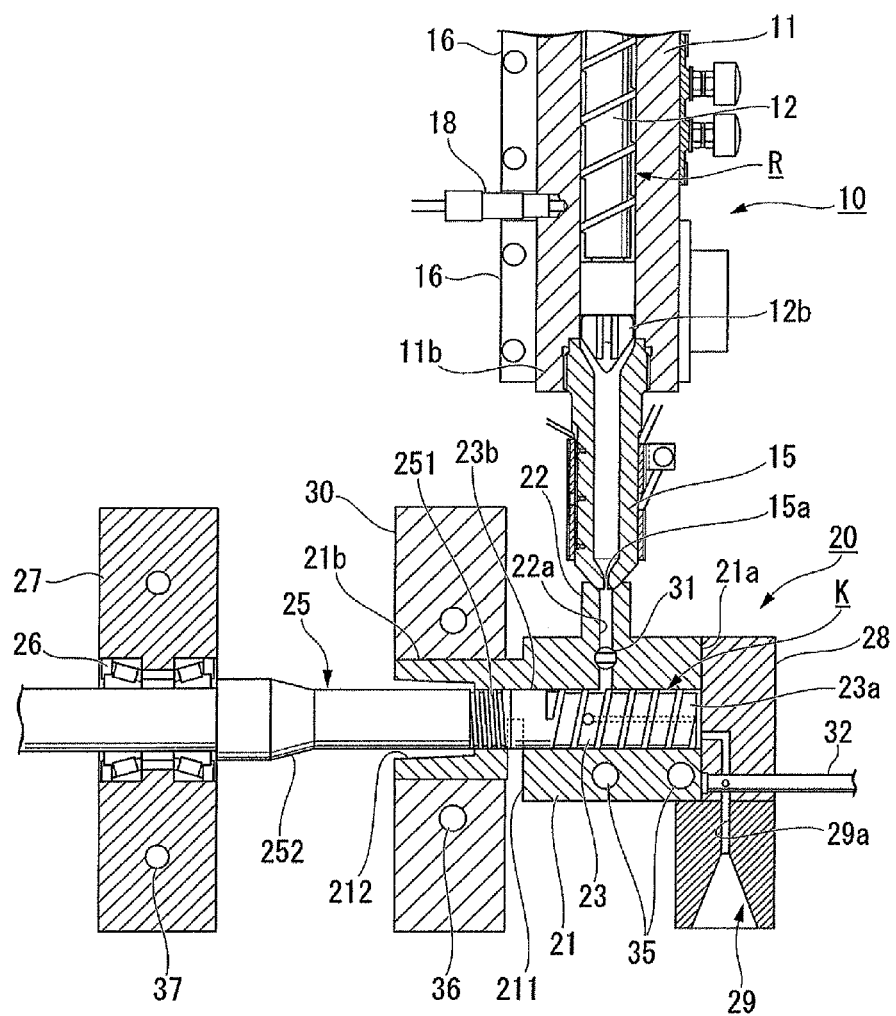
FIG. 3 is a partially cut side view showing a detailed configuration of the high-shear melt-kneader.

As shown in FIGS. 2 and 3, the high-shear unit 20 generally includes the heating tube 21 having a substantially hollow cylindrical shape (corresponding to a material heating tube of the present invention) having a resin supplying portion 22 and disposed in a substantially horizontal direction, the internal feedback-type screw 23 inserted into the heating tube 21 and rotatable in the circumferential direction, a drive motor 24 disposed at a rear side of the internal feedback-type screw 23 (i.e., the side of the base end portion 23b forming one end side in the axial direction of the screw) to rotate the internal feedback-type screw 23 through the shaft 25, an anti-vibration support portion 27 for rotatably supporting the shaft 25 through a bearing 26, and a front end holding portion 28 having a T-die 29 constituting a molded portion formed at a front end side of the other end of the internal feedback-type screw 23 in the axial direction (an opposite side of the base end portion).

As shown in FIG. 3, a longitudinal direction of the heating tube 21 of the high-shear unit 20 is held in a substantially horizontal direction and an outer circumference thereof is covered by a heater 38. That is, as the temperature of the heater 38 is controlled, the temperature of the heating tube 21 can be adjusted. A base end portion 21b (a left side in FIG. 3) of the heating tube 21 is supported by a main body support portion 30, and the front end holding portion 28 is formed at a front end portion 21a. In addition, an introduction path 22a in communication with a hollow portion (a high-shear region K) is formed in the supplying portion 22 formed in the heating tube 21, and the injection port 15a of the injection nozzle 15, which is described above, is coincidentally hooked by an outer circumferential side opening of the introduction path 22a. Accordingly, the melted resin injected from the plasticization unit 10 may be introduced into the high-shear region K (a gap between the heating tube 21 and the internal feedback-type screw 23, shown in FIG. 4) from the supplying portion 22 through the injection nozzle 15.

Figure 4:
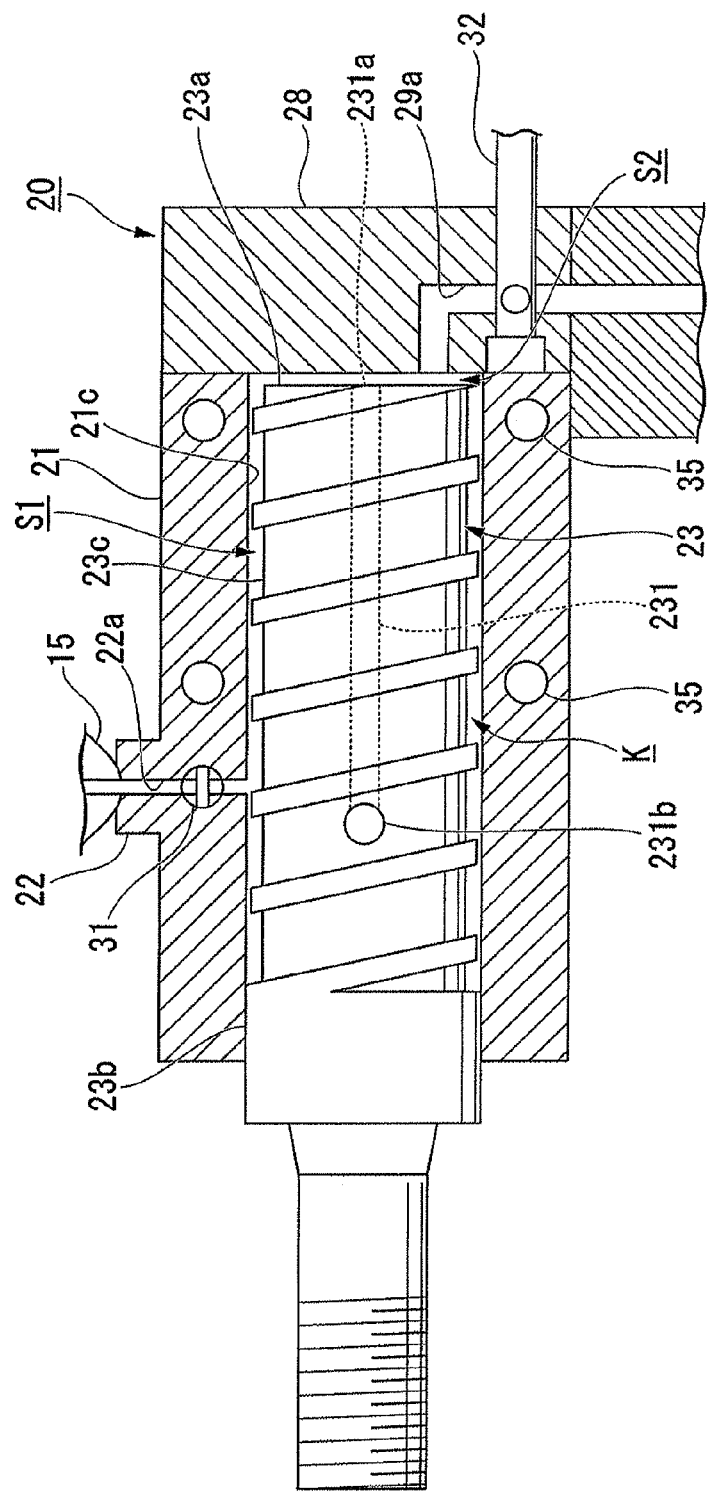
FIG. 4 is an enlarged view of a high-shear screw shown in FIG. 3.

Here, as shown in FIG. 4, a position of the introduction path 22a formed at the supplying portion 22 is more adjacent to the front end side than an outlet 231b, which will be described later, of a feedback hole 231 formed in the vicinity of a rear end of the internal feedback-type screw 23.

In addition, an opening/closing controllable introduction valve 31 is formed in the middle of the introduction path 22a of the supplying portion 22 to adjust a supplying amount of the melted resin into the hollow portion of the heating tube 21 from the plasticization unit 10. The introduction valve 31 may be configured as an automatic opening/closing type that can control the supplying amount according to a preset time, and so on, for example, depending on an opening/closing operation of a discharge valve 32, which will be described later, in the embodiment.

In addition, as shown in FIG. 3, a resin pressure sensor 33 (a pressure sensor) is buried in the heating tube 21 to detect a resin pressure at front and rear portions of the internal feedback-type screw 23 in the axial direction. That is, detection portions of a front portion resin pressure sensor 33A and a rear portion resin pressure sensor 33B are disposed to face the high-shear region K in the heating tube 21. The front portion resin pressure sensor 33A is disposed at a position at which a resin pressure (a first pressure) in the vicinity of a front end portion 23a (near the inlet 231a) of the internal feedback-type screw 23 can be detected, and the rear portion resin pressure sensor 33B is disposed at a position at which a resin pressure (a second pressure) in the vicinity of the outlet 231b (see FIG. 4) of the feedback hole 231 formed at the internal feedback-type screw 23 can be detected. The front portion resin pressure (the first pressure) and the rear portion resin pressure (the second pressure) detected at both of the resin pressure sensors 33A and 33B are managed after performing the high-shear, which will be described later in detail.

The internal feedback-type screw 23 is configured to be rotated while concentrically inserted into the heating tube 21, and straightly connect the base end portion 23b to the shaft 25 connected to the rotary shaft of the drive motor 24, transmitting a rotational force to the drive motor 24. The base end portion 23b of the internal feedback-type screw 23 is configured to be tightly slid with respect to an inner surface 21c (see FIG. 4) of the heating tube 21, except a range of the high-shear region K having no screw blade.

In addition, as shown in FIG. 4, an outer diameter of the internal feedback-type screw 23 is uniform in the axial direction. That is, a groove surface 23c between screw blades is parallel to a center axis of the screw, that is, a gap between the inner surface 21c of the heating tube 21 and the groove surface 23c of an outer circumference of the internal feedback-type screw 23 has a certain gap S1 in the axis direction of the screw. Accordingly, since a gap at the outer circumference of the screw adjacent to the front end does not become smaller similar to a screw, which functions as plasticization, having a compression shape (a tapered shape) formed at the outer circumference (the groove surface 23c between screw blades) of the internal feedback-type screw 23, a material required for kneading may be smoothly circulated to increase high-shear efficiency. Further, a design range of the screw shape may be widened to perform high-shear, and an appropriate shape of screw may also be used according to conditions such as a material of the melted resin, machinability, and so on.

Furthermore, a predetermined gap S2 is also formed between the front end portion 23a and the front end holding portion 28.

In addition, the feedback hole 231 is formed in the internal feedback-type screw 23 along the screw center axis from the front end portion 23a toward the rear end side as described above. Specifically, the feedback hole 231 has one end (the inlet 231a) disposed at a substantially central position when seen from a cross-section of the screw front end portion 23a, extends from the inlet 231a toward the rear end side, changes a direction at a predetermined position in the vicinity of the rear end in a radial direction of the screw 23 to extend to the outer circumference of the screw 23, and has the other end (the outlet 231b) formed at the outer circumference. In the feedback hole 231, the inlet 231a becomes an upstream side of the melted resin flowing in the feedback hole 231 during the high-shear, and the outlet 231b becomes a downstream side. That is, the melted resin introduced into the high-shear region K is transmitted to the front end side together with rotation of the internal feedback-type screw 23, introduced into the feedback hole 231 from the inlet 231a at the front end portion to flow toward the rear side to be ejected from the outlet 231b, and circulated to be transmitted to the front end side together with rotation of the internal feedback-type screw 23. According to the circulation, the melted resin is nano-dispersed, and internal structures of immiscible polymer blend-based, polymer/filler-based and polymer blend/filler-based materials are dispersed/mixed to a nano level.

In addition, the high-shear unit 20 has a control device 2 (control means) for controlling at least one of a material supplying amount, a material temperature, a kneading time, and a screw rotation speed according to pressure values (a front portion resin pressure and a rear portion resin pressure) detected by the front portion resin pressure sensor 33A and the rear portion resin pressure sensor 33B. The control device 2 controls the high-shear melt-kneader 1 such that, during the high-shear, waveforms with the lapse of time of the front portion resin pressure and the rear portion resin pressure are similar to each other and show variation to a steady state after formation of a predetermined peak value, and the front portion resin pressure and the rear portion resin pressure form a predetermined pressure difference with the lapse of time.

In addition, the high-shear melt-kneader 1 has a configuration in which the high-shear unit 20 and the plasticization unit 10 are separated from each other. Further, since the high-shear melt-kneader 1 does not require an ability or shape for heating, plasticizing or melting the resin in the internal feedback-type screw 23, optimal control that satisfies high-shear conditions can be performed.

As shown in FIG. 3, the front end holding portion 28 includes a discharge path 29a in communication with the hollow portion (the high-shear region K) of the heating tube 21, and the T-die 29 is formed at a discharge side of the discharge path 29a and constitutes a molded portion with a path cross-section enlarged toward a lower side thereof. The front end holding portion 28 is also temperature-controlled by the heater 38 (see FIG. 2). In addition, the discharge valve 32 is formed in the middle of the discharge path 29a to adjust a discharge amount of the nano-dispersed resin discharged from the high-shear region K. The discharge valve 32 may be configured as an automatic opening/closing type that can control the discharge amount according to a preset high-shear kneading time, and so on, which is interlocked with the opening/closing operation of the introduction valve 31 described above.

That is, the introduction valve 31 and the discharge valve 32 described above have configurations that can control the introduction (injection by the plasticization unit 10) and discharge at an arbitrary timing, and thus, the high-shear kneading time, discharge time and injection time can be arbitrarily set.

Further, as shown in FIG. 2, temperature sensors 34 (34A, 34B, 34C and 34D) are formed at appropriate positions of the heating tube 21 and the front end holding portion 28 to manage temperatures of the heating tube 21 and the front end holding portion 28 and adjust the temperatures using the heater 38 during the high-shear.

Furthermore, as shown in FIG. 3, cooling flow paths 35, 36 and 37 are formed at the heating tube 21, the main body holding portion 30 and the anti-vibration support portion 27, respectively. The first cooling flow path 35 of the heating tube 21 adjusts the temperature of the heating tube 21. The second cooling flow path 36 (corresponding to the cooling flow path of the present invention) of the main body holding portion 30, which will be described later in detail, cools a position corresponding to the base end portion 23b of the internal feedback-type screw 23 of the heating tube 21. In addition, the third cooling flow path 37 of the anti-vibration support portion 27 cools the shaft 25 at the anti-vibration support portion 27 to protect the bearing 26 from heat transferred from the heating tube 21 through the shaft 25 or heat transferred from the drive motor 24.

Next, a structure for preventing introduction of the melted resin into the drive motor 24 or the bearing 26 installed at the high-shear unit 20 will be described with reference to the accompanying drawings.

As shown in FIG. 3, a slit 211 (a notch portion) is formed in the heating tube 21 of the high-shear unit 20 at a predetermined position corresponding to the base end portion 23b of the internal feedback-type screw 23 and in a substantially lower half range in a circumferential direction of the heating tube 21. Accordingly, the resin leaked from the base end portion 23b of the screw rear end during the high-shear can be smoothly discharged downward from the slit 211.

In addition, a tapered heating tube surface 212 having an inner diameter enlarged from a front portion to a rear portion thereof is formed at an inner surface of the base end portion 21b of the heating tube 21. Accordingly, the resin leaked from the high-shear region K, not discharged from the above-described slit 211 and leaked from the rear end side is guided rearward, and then, smoothly discharged from the rear end portion.

As the slit 211 and the tapered heating tube surface 212 are formed, for example, introduction of the resin into the drive motor 24 formed at the base end portion 23b (the rear side) of the internal feedback-type screw 23 or the bearing 26 of the anti-vibration support portion 27 can be prevented, and stable continuous operation of the high-shear unit 20 can be performed.

In addition, a threaded groove portion 251 having a reverse thread shape is formed at the outer circumference of the front end side of the shaft 25 (the side of the internal feedback-type screw 23). Accordingly, together with rotation of the shaft 25, the melted resin, not discharged from the above-described slit 211, is guided to the threaded groove portion 251 to be sent to the rear portion, and thus, the leaked resin can be more effectively discharged.

Further, a tapered shaft surface 252 having a diameter enlarged from the front portion to the rear portion is formed at the shaft 25 adjacent to the internal feedback-type screw 23 of the anti-vibration support portion 27. Accordingly, the resin leaked from the base end portion 23b of the internal feedback-type screw 23 during the high-shear can be cooled and solidified, and then moved rearward along the shaft 25. Next, the resin moved rearward arrives at the tapered shaft surface 252 formed at a front side before the anti-vibration support portion 27 and then moves in a direction of enlarging the tapered surface to be automatically divided, and thus, the resin can be freely dropped from the tapered shaft surface 252. That is, since the resin leaked at a front side of the anti-vibration support portion 27 is removed, introduction of the resin into the bearing 26 formed at the anti-vibration support portion 27 can be prevented.

Furthermore, as described above, the second cooling flow path 36 is formed at the main body support portion 30 and cools the heating tube 21 disposed therearound. For this reason, the resin leaked from the rear end of the internal feedback-type screw 23 during the high-shear is cooled and solidified, and thus, the resin can be stuck to the outer circumference of the above-described shaft 25. As a result, the resin can be effectively moved rearward along the shaft 25, without dropping and leakage of the resin in the middle of the shaft 25, and the resin can be divided at the tapered shaft surface 252 to be freely dropped.

Figure 5:
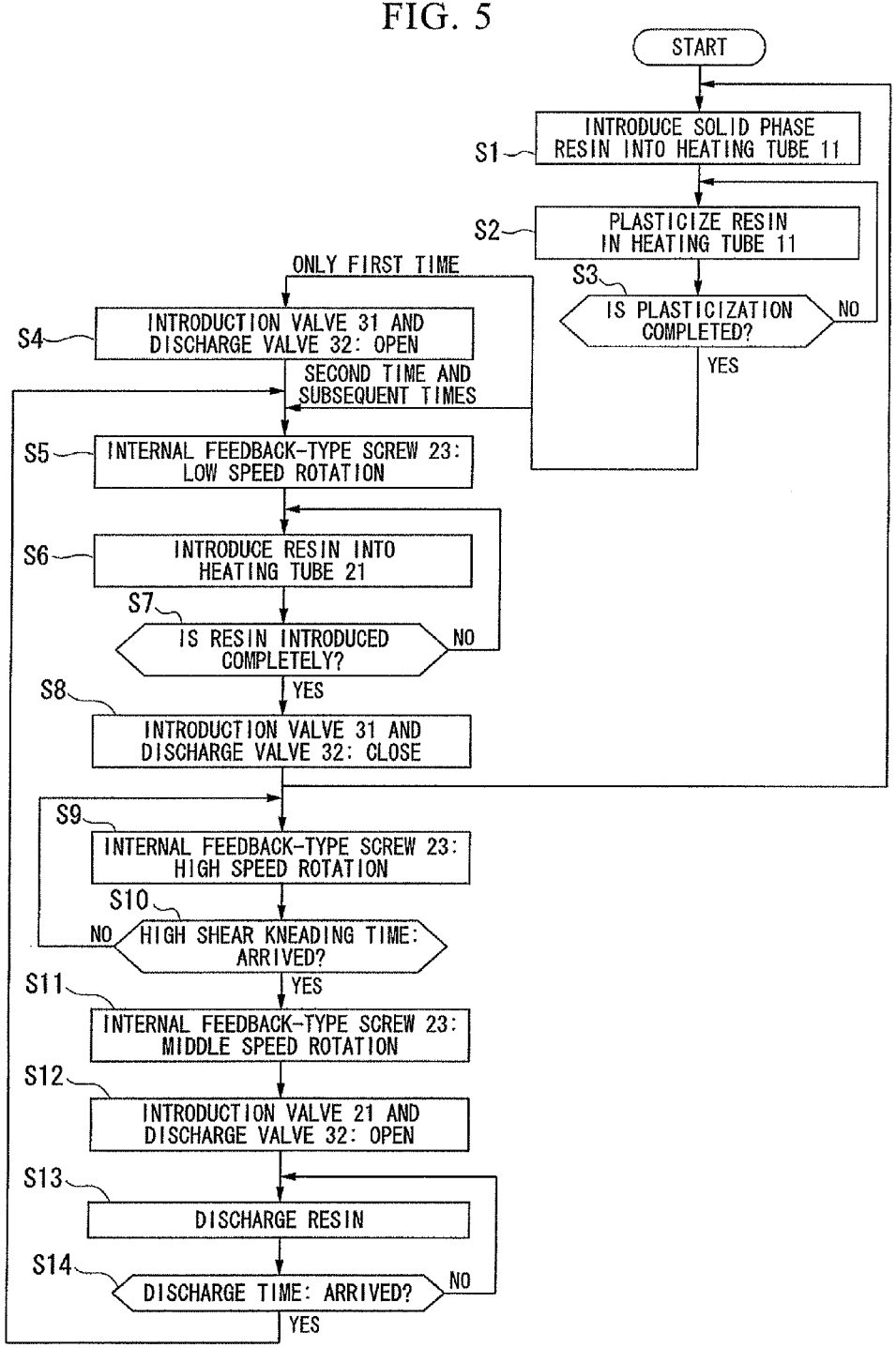
FIG. 5 is a flow chart showing high-shear manufacture using the high-shear melt-kneader.

Next, a method of dispersing/mixing internal structures of immiscible polymer blend-based, polymer/filler-based and polymer blend/filler-based materials to a nano level using the above-described high-shear melt-kneader 1 will be described with reference to a manufacturing flow of FIG. 5.

In the high-shear melt-kneader 1 shown in FIG. 1, as described above, a resin in which at least two resins are mixed may be used as a polymer blend-based solid phase resin. First, when the solid phase resin is plasticized using the plasticization unit 10 formed in a state injectable with respect to the high-shear unit 20, the first drive motor 132 of the rotary mechanism 13A is driven to rotate the plasticization screw 12 to an appropriate speed. In addition, the heating tube 11 is heated to an appropriate temperature by the heater 16 wound around the outer circumference thereof. Next, the solid phase resin is supplied from the hopper 14 into the heating tube 11 which functions as the plasticization region R (Step S1 shown in FIG. 5). Then, as the plasticization screw 12 is rotated, the solid phase resin is heated and plasticized by the heater 16 for a predetermined time (Step S2). Accordingly, the resin in the plasticization region R is plasticization-melted and kneaded to become a melted resin. That is, plasticization of the resin into the plasticization region R of the plasticization unit 10 is completed (Step S3).

Next, the melted resin in the plasticization unit 10 is introduced into the heating tube 21 of the high-shear unit 20 (Steps S4 to S7).

Specifically, at the timing that a desired shape of the melted resin is obtained (at the timing that Step S3 is completed), the introduction valve 31 and the discharge valve 32 of the high-shear unit 20 are opened, and the respective flow paths (the introduction path 22a and the discharge path 29a) are opened (Step S4).

In this state, the second drive motor 137 is driven to move the ball screw 135 forward together with the fixing portion 131 through the nut 136. Then, according to forward movement of the screw rotary shaft 133 on the fixing portion 131, the plasticization screw 12 moves forward in the heating tube 11 in the axial direction thereof. Accordingly, the plasticization screw 12 injects the melted resin plasticized in the heating tube 11 from the injection nozzle 15 into the heating tube 21 of the high-shear unit 20.

In the high-shear unit 20, the internal feedback-type screw 23 in the heating tube 21 is rotated at a low speed (for example, 0 to 300 rpm) (Step S5). At this time, since the interior of the heating tube 21 (the interior of the high-shear region K) of the high-shear unit 20 before introduction is empty, as the melted resin is introduced, the internal air is discharged from the discharge path 29a by the melted resin, and the interior of the heating tube 21 of the high-shear unit 20 is slowly filled with the melted resin (Step S6).

Next, when the introduction of the melted resin is completed (Step S7: YES), Step S8 is performed to close the introduction valve 31 and the discharge valve 32, blocking the flow paths 22a and 29a. Meanwhile, when the introduction is not completed (Step S7: NO), the melted resin is continuously introduced. In addition, the introduction completion may be determined by pressure values detected by the resin pressure sensors 33A and 33B formed at front and rear portions of the internal feedback-type screw 23. That is, when substantially the same predetermined pressure as the front portion of the internal feedback-type screw 23 is generated in the vicinity of the outlet of the feedback hole of the internal feedback-type screw 23, the introduction completion is determined.

Then, in Step S8 in which the introduction valve 31 and the discharge valve 32 are blocked, the high-shear is performed in the high-shear unit 20 (Step S9), Meanwhile, in the plasticization unit 10, a new resin is plasticized according to Steps S1 to S3.

In Step S9, the internal feedback-type screw 23 in the heating tube 21 is rotated at a high speed (for example, 100 to 3000 rpm), and the melted resin in the high-shear region K is high-sheared for a predetermined set time to perform nano dispersion, forming the nano-dispersed resin. At this time, as shown in FIG. 4, the melted resin introduced into the high-shear region K is sent to the front end side around the outer circumference of the internal feedback-type screw 23 according to rapid rotation of the screw 23, flows rearward from the inlet 231a of the feedback hole 231 at the front end portion 23a of the internal feedback-type screw 23, is discharged from the outlet 231b toward the outer circumference of the internal feedback-type screw 23 by a centrifugal force to be fed back onto the groove surface 23c, and is returned to the front end side, which steps are repeated for a predetermined time. Accordingly, high-shear stress is applied to the melted resin.

At this time, by rotating the internal feedback-type screw 23 at a predetermined rotation speed while controlling a resin temperature, a resin pressure, a kneading time and a screw rotation speed under optimal conditions in the high-shear unit 20 according to the input resin material, the melted resin flows from the inlet 231a of the feedback hole to the outlet 231b to be circulated and kneaded, applying the high-shear stress. In addition, a specific high-shear method will be described later.

Next, when the high-shear machining time arrives at the predetermined set time (Step S10: YES), a rotational speed of the internal feedback-type screw 23 is converted from high speed rotation into middle speed rotation (for example, 200 to 1000 rpm) (Step S11). The middle speed rotation is a region having a rotation speed larger than that of the low speed rotation and smaller than that of the high speed rotation. Next, the introduction valve 31 and the discharge valve 32 are opened in Step S12, and the respective flow paths (the introduction path 22a and the discharge path 29a) are opened. Accordingly, the nano-dispersed resin in the high-shear region K processed by the high-shear is discharged from the discharge path 29a of the front end side together with rotation of the internal feedback-type screw 23, and the melted resin discharged from the T-die 29 can be obtained as a polymer blend extrusion material.

Next, when the discharge time arrives at a predetermined set time (Step S14: YES), that is, when the nano-dispersed resin manufactured in the heating tube 21 of the high-shear unit 20 is entirely discharged, Step S5 is performed again. In this case, together with the high speed rotation of the internal feedback-type screw 23 in Step S9, a new solid phase resin is input into the plasticization unit 10 to complete plasticization of the resin (Steps S1 to S3). In addition, as the internal feedback-type screw 23 of the high-shear unit 20 is rotated from the middle speed rotation to the low speed rotation (Step S5), the melted resin obtained in Step S3 is introduced from the plasticization unit 10 into the heating tube 21 through the injection nozzle 15 (Step S6). Then, similar steps may be repeated to sequentially disperse/mix internal structures of immiscible polymer blend-based, polymer/filler-based and polymer blend/filler-based materials to a nano level.

Hereinafter, the high-shear method using the high-shear melt-kneader 1 will be described in detail with reference to the accompanying drawings.

Figure 6:
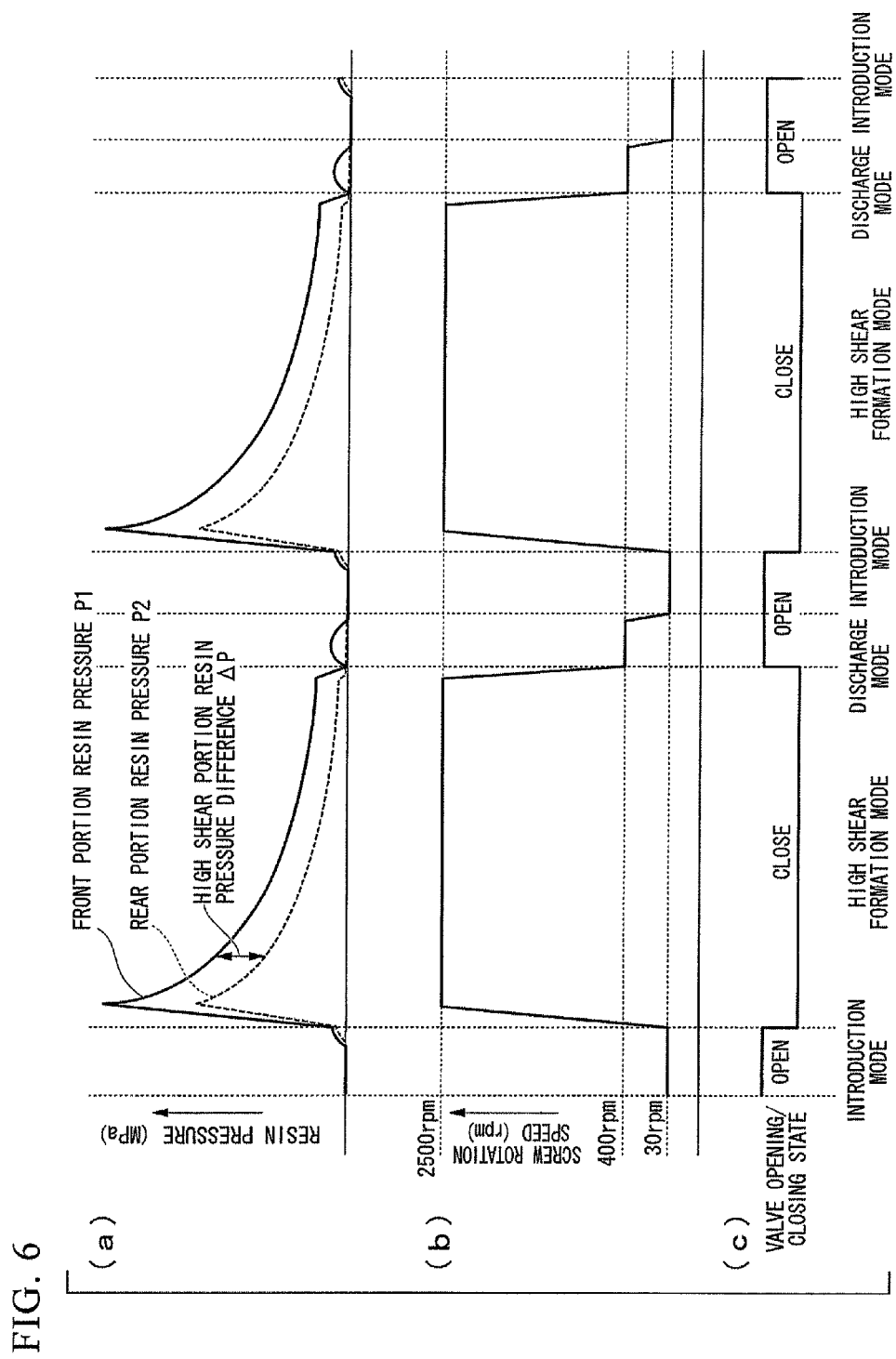
FIG. 6 is a timing chart upon high-shear in a high-shear unit.

FIG. 6 is a timing chart showing two times of high-shears. In FIG. 6, a horizontal axis represents a time of high-shear. In addition, a vertical axis of (a) in FIG. 6 represents a resin pressure (MPa), a vertical axis of (b) in FIG. 6 represents a screw rotation speed (rpm), and a vertical axis of (c) in FIG. 6 represents an opening/closing state of a resin introduction valve and a resin discharge valve.

As shown in (a) to (c) in FIG. 6, in a high-shear mode, the introduction valve 31 and the discharge valve 32 are closed by the control means 2, and the rotation speed of the internal feedback-type screw 23 is rotated at a high speed rotation mode, for example, 300 to 3000 rpm (2500 rpm in (b) of FIG. 6). Then, the melted resin is sent toward the front end side at the outer circumference of the internal feedback-type screw 23 together with rotation thereof, flows reward from the inlet 231a of the feedback hole 231 at the front end portion 23a of the internal feedback-type screw 23, is discharged from the outlet 231b toward the outer circumference of the internal feedback-type screw 23 by a centrifugal force to be fed back, and is sent to the front end side again to cause circulation. Accordingly, a large shear speed (for example, maximally $4.4 \times 10^3$ $s^{-1}$) is generated, and the melted resin is kneaded to be nano-dispersed.

That is, in the high-shear method, when the internal feedback-type screw 23 is rapidly rotated by initiation of the high-shear, at least one of a material supplying amount, a material temperature, a kneading time and a screw rotation speed is controlled by the control device 2 according to pressure values (a front portion resin pressure P1 and a rear portion resin pressure P2) detected by the front portion resin pressure sensor 33A and the rear portion resin pressure sensor 33B.

Specifically, the control device 2 controls such that waveforms with the lapse of time of the front portion resin pressure P1 and the rear portion resin pressure P2 are similar to each other and show variation to a steady state after formation of a predetermined peak value, and the front portion resin pressure P1 and the rear portion resin pressure P2 form a predetermined pressure difference ΔP (the front portion resin pressure P1—the rear portion resin pressure P2) with the lapse of time. That is, waveforms of the front portion resin pressure P1 and the rear portion resin pressure P2 may be controlled to be substantially parallel to each other, and the pressure difference ΔP may be 3 MPa or more.

As the front portion resin pressure P1 and the rear portion resin pressure P2 in the high-shear region K are managed as described above, high-shear stress having a certain flow can be applied to the resin kneaded by rotation of the internal feedback-type screw 23. Accordingly, the entire high-sheared resin can be uniformly nano-dispersed.

That is, the solid phase resin may be microsized by the high-shear such that the resin cannot be obtained at a low speed or a middle speed, which is performed in the conventional art, and a good material having characteristics not seen in the conventional art may be manufactured. For example, as the internal structures of the immiscible polymer blend-based, polymer/filler-based and polymer blend/filler-based materials are dispersed/mixed to a nano level, a good material having high transparency can be manufactured.

As described above, in the high-shear melt-kneader and the high-shear method according to the embodiment, by controlling at least one of a material supplying amount, a material temperature, a kneading time and a screw rotation speed according to a resin pressure during the high-shear with respect to the optimal temperature resin supplied from the plasticization unit 10 in the high-shear unit 20, the high-shear may be performed to effectively nano-disperse the resin with high precision. As a result, in a stable and fine state, the internal structures of the immiscible polymer blend-based, polymer/filler-based and polymer blend/filler-based materials can be continuously dispersed/mixed to a nano level.

As described above, in order to support the high-shear melt-kneader and the high-shear method according to the embodiment, an example will be described below.

Example

In Example, a polymer blend-based resin in which polycarbonate (PC) and acryl (PMMA) were mixed at a ratio of 8:2 was nano-dispersed by a high-shear unit to manufacture a polymer blend extrusion material using the high-shear melt-kneader 1 shown in FIG. 1.

First, in a plasticization unit, a heating tube 11 was heated to a temperature of 220° C. and a plasticization screw 12 was rotated at a low speed of 300 rpm or less, and thus, the resin was plasticized and melted to manufacture a uniformly kneaded and melted resin.

The melted resin was introduced into a heating tube 21 of a high-shear unit 20, and the high-shear was performed using an internal feedback-type screw 23 having a screw diameter of 28 mm, a screw pitch of 11 mm, a flight (screw thread) width of 2 mm, a feedback hole diameter of 2.5 mm, and an effective screw length (a distance from a front end of the screw to a center of an outlet of the feedback hole) of 50 mm under conditions of a screw rotation speed of 2500 rpm, a high-shear time of 30 seconds, a cooling temperature of the heating tube 21 of 220° C., and a temperature of a heater 38 of the heating tube 21 of 230° C., obtaining a nano-dispersed resin. In addition, the supplying amount of the resin into the heating tube 21 of the high-shear unit 20 was determined as an amount when a pressure P2 was generated in the vicinity of an outlet 231b of a feedback hole 231 of the internal feedback-type screw 23 when there was no leakage of the resin from a rear portion of the heating tube 21.

In addition, a front portion resin pressure P1 and a rear portion resin pressure P2 in the heating tube 21 of the high-shear unit 20 were detected by a resin pressure sensor, a waveform of the resin pressure was checked, and properties (transparency) of the manufactured polymer blend extrusion material were determined. Further, as Comparative example, the polymer blend extrusion material was manufactured in a state in which characteristics of the resin pressure shown in (a) of FIG. 6 were not obtained. Here, FIG. 7A is a photograph showing a formed product formed in a thin film shape by a polymer blend extrusion material manufactured through the embodiment, and FIG. 7B is a photograph showing a formed product formed in a thin film shape by a polymer blend extrusion material manufactured in a state in which characteristics of the resin pressure shown in (a) of FIG. 6 were not obtained.

As shown in (a) of FIG. 6, since the resin pressures P1 and P2 in the high-shear according to Example are forcedly transmitted to the front portion by the internal feedback-type screw 23, the front portion resin pressure P1 is larger than the rear portion resin pressure P2. In addition, the front portion resin pressure P1 and the rear portion resin pressure P2 arrived at peak values (22 MPa at the front portion resin pressure P1) just after initiation of the high-shear, and then, the high-shear stress was applied to obtain characteristics that the pressure values were reduced in waveforms having smooth curves. Further, it could be confirmed that a pressure difference ΔP (the front portion resin pressure P1—the rear portion resin pressure P2) between the front portion resin pressure P1 and the rear portion resin pressure P2 was substantially uniform (9 MPa) and larger than 3 MPa after the peak value.

Figure 7A:
FIG. 7A is a view showing a state of a polymer blend extrusion material manufactured through Example of the present invention.
Figure 7B:
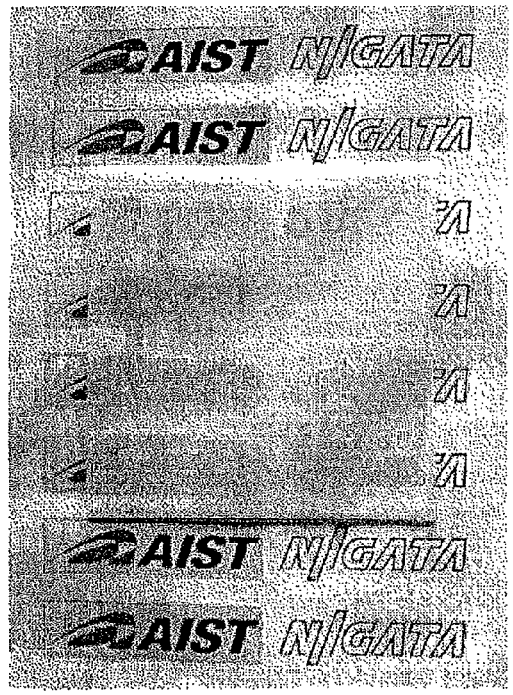
FIG. 7B is a view showing a state of a polymer blend extrusion material manufactured through Comparative example.
Figure 8:
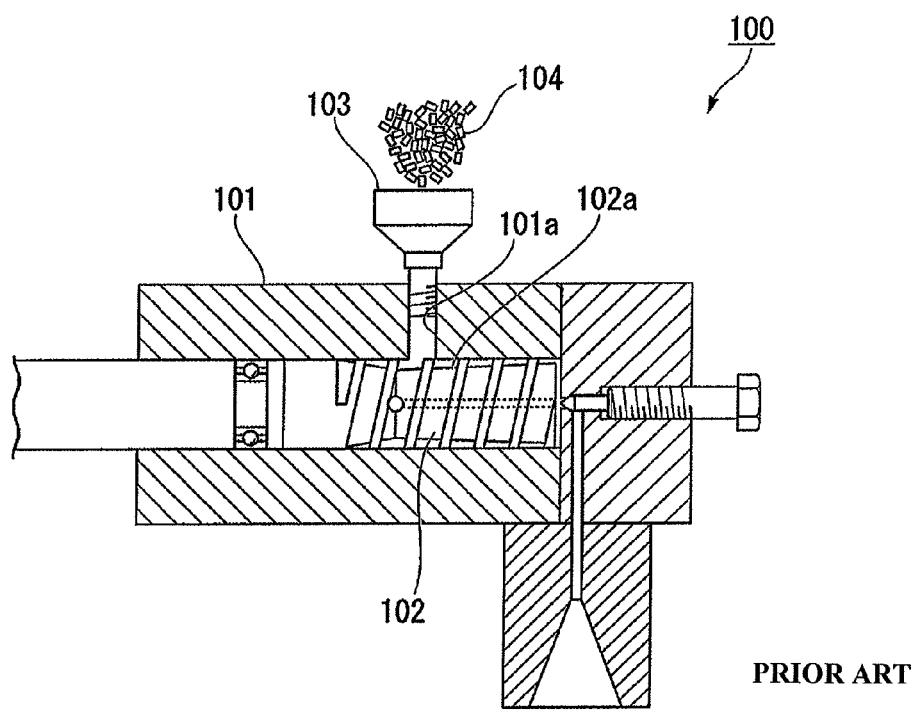
FIG. 8 is a partially cut side view showing a schematic configuration of a conventional high-shear melt-kneader.

As a result, as shown in FIG. 7A, the polymer blend extrusion material having good transparency could be manufactured throughout the material. In Example, it will be appreciated that characters AIST and NIIGATA on a bottom surface of the formed product by the polymer blend extrusion material are clear, and transparency of the material can be confirmed. Meanwhile, in the formed product by Comparative example shown in FIG. 7B, the material became cloudy, the characters on the bottom surface could not be recognized, and transparency could not be obtained.

While PC and PMMA are essentially transparent resins, an opaque sample was obtained in a blend material in which the above-described characteristics of the resin pressures P1 and P2 were not obtained, and a transparent sample was obtained in a blend material in which the resin pressures P1 and P2 were obtained. Transparency means that a wavelength is much lower than a visible wavelength region of 400 to 700 nm. That is, it is proved that the sample is mixed to a nano level in the transparent blend sample.

While the embodiments of the high-shear melt-kneader and the high-shear method in accordance with the present invention have been described, the present invention is not limited to the embodiments and may be appropriately modified without departing from the spirit of the present invention.

For example, while the embodiments employ the plasticization unit 10 (the plasticization portion) including the plasticization screw 11, the embodiment is not limited thereto. In addition, when a material supplied to the high-shear portion is rubber, and so on, instead of the plasticization portion, a pre-heating portion without the plasticization screw may be provided to heat the material. That is, in the pre-heating portion, the material may be melted by heating. Further, while the material heated by the pre-heating portion in this embodiment employs a solid phase resin, the resin may be formed of a material having a powder, fluid or particle shape, for example, immiscible polymer blend-based, polymer/filler-based and polymer blend/filler-based materials.

In addition, in this embodiment, the plasticization unit 10 is detachably attached to the high-shear unit 20, the melted resin is injected using the plasticization unit 10, and the melted resin is introduced into the heating tube 21 (the high-shear region K) of the high-shear unit 20, but the present invention is not limited thereto. That is, in a state in which the plasticization unit 10 is separated from the high-shear unit 20, another means of supplying only the melted resin into the high-shear region K of the high-shear unit 20 may be used, or a separate plasticization portion different from the plasticization unit 10 of this embodiment may be used. That is, the plasticization portion for plasticizing the solid phase resin to obtain the melted resin may be separated from the high-shear portion, and only the melted resin having appropriate properties may be introduced into the high-shear portion.

Further, configurations such as shapes, dimensions, and so on, of the heating tube 21 and the internal feedback-type screw 23 of the high-shear unit 20 are not limited to the embodiment and may be arbitrarily set.

Furthermore, positions and numbers of the supplying portion 22, the resin pressure sensor 33, the temperature sensor 34, the cooling flow paths 35, 36 and 37, the heater 38, and so on, of the high-shear unit 20 may be arbitrarily set.

In addition, in this embodiment, the slit 211 formed in the heating tube 21, the tapered surface 212 of the heating tube 21, the threaded groove portion 251 formed in the shaft 25, and the tapered shaft surface 252 correspond to the resin leaked from the high-shear region K, and may be omitted.

INDUSTRIAL APPLICABILITY

As described above, according to the high-shear melt-kneader and the high-shear method of the present invention, it is possible to improve high-shear efficiency, increase precision of nano dispersion of a material, and stably and finely disperse/mix internal structures of immiscible polymer blend-based, polymer/filler-based and polymer blend/filler-based materials.

DESCRIPTION OF REFERENCE NUMERALS

1: High-shear melt-kneader
2: Control device (control means)
10: Plasticization unit (plasticization portion, pre-heating portion)
11: Heating tube of plasticization unit
12: Plasticization screw
13: Drive portion
14: Hopper
15: Injection nozzle
16: Heater of plasticization unit
20: High shear unit (high-shear portion)
21: Heating tube of high-shear unit (material heating tube)
211: Slit (notch portion)
212: Tapered heating tube surface
22: Supplying portion
22a: Introduction path
23: Internal feedback-type screw
23a: Front end portion
23b: Base end portion
231: Feedback hole
231a: Inlet of feedback hole
231b: Outlet of feedback hole
24: Drive motor of internal feedback-type unit
25: Shaft
251: Threaded groove portion
26: Bearing
27: Anti-vibration support portion
28: Front end holding portion
29: T-die
29a: Discharge path
31: Introduction valve
32: Discharge valve
33A: Front portion resin pressure sensor (pressure sensor)
33B: Rear portion resin pressure sensor (pressure sensor)
36: Second cooling flow path (cooling flow path)
K: High shear region
R: Plasticization region
P1: Front portion resin pressure (first pressure)
P2: Rear portion resin pressure (second pressure)

The invention claimed is:

1. A high-shear melt-kneader for applying high-shear stress and kneading immiscible polymer blend-based, polymer and filler-based and polymer blend and filler-based materials to disperse and mix internal structures of the materials to a nano level, the melt-kneader comprising:
a pre-heating portion configured to heat the materials;
a high-shear portion configured to supply the materials heated by the pre-heating portion, and the high-shear portion including
an internal feedback-type screw which applies the high-shear stress to the supplied materials, and
a material heating tube;
a first pressure sensor positioned at a front portion of the internal feedback-type screw in an axial direction thereof so as to face a high-shear region of the heating tube and configured to detect a first pressure in the vicinity of an inlet of the feedback hole of the internal feedback-type screw, and a second pressure sensor positioned at a rear portion of the internal feedback-type screw in the axial direction thereof so as to face the high-shear region of the heating tube and configured to detect a second pressure in the vicinity of an outlet of the feedback hole; and
a controller configured to control at least one of a material supplying amount, a material temperature, a kneading time, and a screw rotation speed according to pressure values detected by the first and second pressure sensors,
wherein a pressure is generated in the vicinity of the outlet of the feedback hole of the internal feedback-type screw during the high-shear; and
the controller is configured to control the at least one of the material supplying amount, the material temperature, the kneading time, and the screw rotation speed of the high-shear kneader so that a first waveform corresponding to an amount of the first pressure in relation to a period of time of the first pressure and a second waveform corresponding to an amount of the second pressure in relation to the period of time are similar to each other and are at a same timing, and such that the first waveform and the second waveform show variation to a steady state after formation of predetermined peak values of the amount of pressure, and such that the first pressure and the second pressure form a predetermined pressure difference with respect to each other over the period of time.

2. The high-shear melt-kneader according to claim 1, wherein the pre-heating portion is a plasticization portion configured to plasticize and melt the materials in a solid phase.

3. The high-shear melt-kneader according to claim 2, wherein the plasticization portion includes:
a plasticization screw configured to melt the material in a solid phase; and
an injection portion configured to inject the material plasticized by the plasticization screw to the high-shear portion.

4. The high-shear melt-kneader according to claim 1, wherein a rotation speed of the internal feedback-type screw is 100 to 3000 rpm.

5. The high-shear melt-kneader according to claim 1, further comprising:
a material supplying portion formed at the high-shear portion, the material supplying portion configured to supply the material heated by the pre-heating portion, and an introduction valve formed at the material supplying portion and configured to enable opening control and closing control.

6. The high-shear melt-kneader according to claim 1, further comprising:
a material discharge portion formed at the high-shear portion, the material discharge position configured to discharge the high-sheared material, and
a discharge valve formed at the material discharge portion and configured to enable opening and closing control.

7. The high-shear melt-kneader according to claim 1, wherein an outer diameter dimension of the internal feedback-type screw is uniform in an axial direction thereof.

8. The high-shear melt-kneader according to claim 1, wherein the material heating tube comprises a notch portion formed at a predetermined position corresponding to a base end side of the internal feedback-type screw.

9. The high-shear melt-kneader according to claim 1, wherein a tapered heating tube surface is formed in an inner surface of a base end side of the material heating tube to be enlarged from a front end side to the base end side.

10. The high-shear melt-kneader according to claim 1, wherein a cooling flow path is formed at a predetermined position of a base end side of the material heating tube.

11. The high-shear melt-kneader according to claim 1, wherein a shear portion comprises a shaft configured to concentrically connect rotary shafts of the internal feedback-type screw and a drive motor for driving the screw; and
an outer circumference of a front end of the shaft adjacent to the internal feedback-type screw comprises a threaded groove portion having a reverse thread shape.

12. The high-shear melt-kneader according to claim 11, wherein the shaft is rotatably supported at a middle portion in the axial direction by an anti-vibration support portion, and a tapered shaft surface is formed at a predetermined position adjacent to the internal feedback-type screw, and has an inner diameter increased from the screw side to the drive motor side.

13. A method of high shearing by applying high-shear stress and kneading immiscible polymer blend-based, polymer and filler-based and polymer blend and filler-based materials to disperse and mix internal structures of the materials to a nano level, the method comprising:
a first process of pre-heating the materials;
a second process of supplying the materials heated in the first process to a high-shear portion, and applying high-shear stress to the materials using an internal feedback-type screw;
a third process of detecting a first pressure in vicinity of an inlet of a feedback hole of the internal feedback-type screw by a first pressure sensor positioned at a front portion of the internal feedback-type screw in an axial direction thereof so as to face a high-shear region of a heating tube, and a second pressure in the vicinity of an outlet of the feedback hole by a second pressure sensor positioned at a rear portion of the internal feedback-type screw in the axial direction thereof so as to face the high-shear region of the heating tube; and
a fourth process of controlling at least one of a material supplying amount, a material temperature, a kneading time, and a screw rotation speed according to pressure values detected in the third process,
wherein a pressure is generated in the vicinity of the outlet of the feedback hole of the internal feedback-type screw during the high-shear, and
the fourth process includes controlling the at least one of the material supplying amount, the material temperature, the kneading time, and the screw rotation speed of a high-shear kneader so that a first waveform corresponding to an amount of the first pressure in relation to a period of time of the first pressure and a second waveform corresponding to an amount of the second pressure in relation to the period of time are similar to each other and are at a same timing, and such that the first waveform and the second waveform show variation to a steady state after formation of predetermined peak values of the amount of pressure, and such that the first pressure and the second pressure form a predetermined pressure difference with respect to each other over the period of time.

* * * * *